Sept. 25, 1934.  J. F. MAURER, JR  1,974,718
HANDLE PORTION REENFORCEMENT FOR MILK BOTTLE CASES
Filed Jan. 23, 1934
Fig. 1.
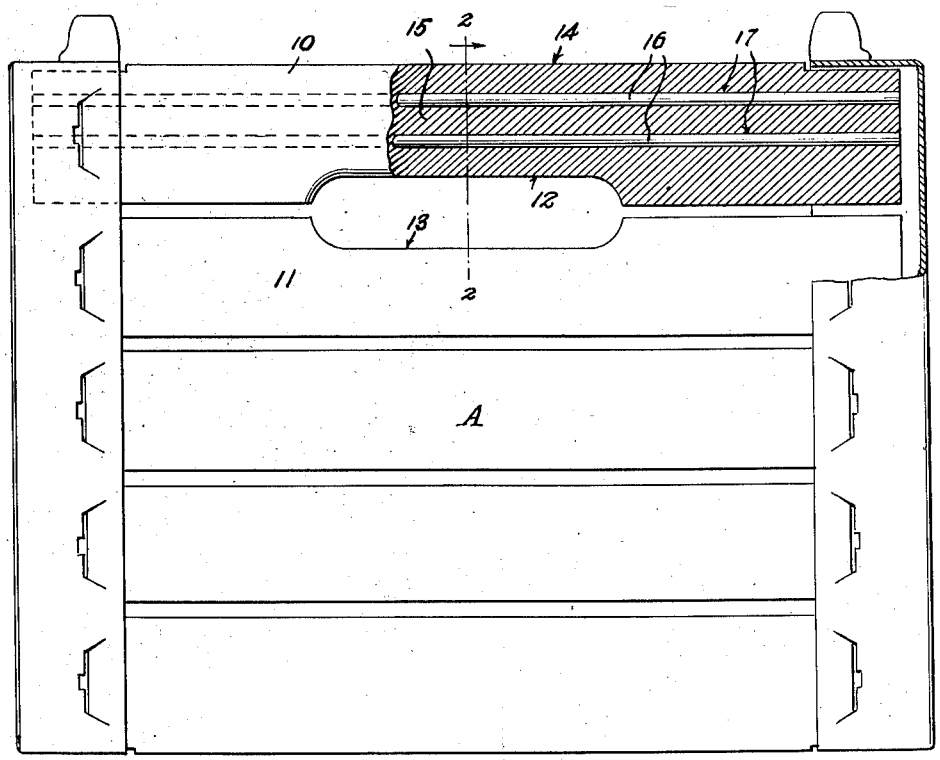
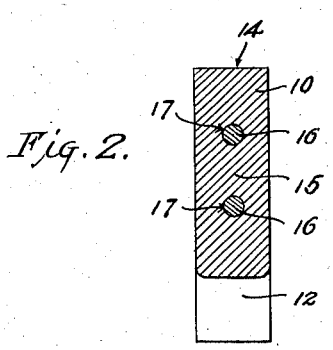
Fig. 2.
Fig. 3.
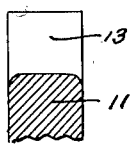
INVENTOR.
JOHN F. MAURER, JR.
BY
Clarke & Ott
ATTORNEYS.

Patented Sept. 25, 1934

1,974,718

UNITED STATES PATENT OFFICE 1,974,718

HANDLE PORTION REENFORCEMENT FOR MILK BOTTLE CASES

John F. Maurer, Jr., North Bergen, N. J.

Application January 23, 1934, Serial No. 707,902

3 Claims. (Cl. 217—19)

This invention relates to crates or cases, and has particular reference to an improvement in milk bottle cases, the principal object in view being to reenforce and strengthen the structure adjacent the handle portions thereof.

It has been observed that due to the rough usage to which milk bottle cases are subjected, the portions of the end walls which lie immediately above the handle openings present weakened areas which frequently fracture after a rather limited use and generally long before the remainder of the case is ready to be discarded. This pertains particularly to bottle cases of the slatted type in which the handle portions are defined by notching out the lower edge of the uppermost slat of the end wall.

The present invention comprehends a reenforcement for the handle portion which functions to strengthen the case structure in this area or region so as to resist buckling stresses and strains imparted thereto without increasing the thickness of the end wall or materially adding to the weight of the case.

More specifically, the invention contemplates a reenforcement of the handle portion or area of a milk bottle case, which consists in providing a metallic reenforcing rod or rods extending longitudinally of the end wall and handle portion and which is located within the confines thereof.

The invention further embodies a reenforcement of the indicated character which is comparatively simple and not complicated, which may be inexpensively incorporated in the case structure and which efficiently performs its intended purpose.

With the above enumerated and other objects in view, reference is now made to the following specification and to the accompanying drawing in which there is disclosed, by way of example, several forms of the invention, while the claims cover variations and modifications which fall within the scope of the invention.

In the drawing:

Fig. 1 is an end view of a milk bottle case with parts broken away and shown in sections to disclose the reenforcing means.

Fig. 2 is an enlarged fragmentary vertical sectional view taken approximately on the line 2—2 of Fig. 1.

Fig. 3 is a similar view illustrating a modification of the invention.

Referring to the drawing by characters of reference, A designates generally the end wall of a case structure which is of the slatted type and in which the two uppermost slats 10 and 11 are provided with mating notched or cut-out portions 12 and 13, the notch 12 of the top slat 10 being formed in the lower edge thereof and the notch 13 of the next adjacent slat 11 being formed in the upper edge thereof so as to provide a finger receiving opening, and to define between the notch 12 of the top slat and the upper edge 14 thereof a handle portion 15 which is adapted to be grasped by the hand. Due to the cut away or notch portion 12, it is apparent that the top slat 10 is weakened at the middle handle portion 15 and is, therefore, more readily subject to fracture than any other portion of the case due to its vulnerable location at the upper edge of the case.

In order to provide means for reenforcing the handle portion 15 without materially increasing the weight of the case structure or the thickness of the end wall, one or more reenforcing elements 16 are employed, which in the form of the invention shown in Figs. 1 and 2, extend through longitudinally extending bores 17 in the top slat 10 of the end wall, said rods lying wholly within the confines of the slat and extending throughout its length. Obviously, the rods which are preferably of metal add considerable strength to the top slat and resist the bending or buckling strains and stresses which are imparted thereto when the filled case is lifted by the handle portion in addition to reenforcing the slat against inward or outward buckling due to the impact of blows to which the cases are subjected.

In the modification illustrated in Fig. 3, 20 designates a top slat, the inner face 21 of which is provided with grooves or channels 22 with the reenforcing rods 23 arranged in the grooves or channels to strengthen and reenforce the handle portion 24 of the slat defined between the notch or cut-out 25 and the upper edge 26.

What is claimed is:

1. As a new article of manufacture, a top slat for the slatted end wall of a milk bottle case having a medial notch in its lower edge defining between its notch and its upper edge a handle portion, said slat having a bore extending longitudinally thereof from one end edge to the other and located between the upper edge of the slat and the notched portion of the lower edge and a reenforcing element extending through said bore and snugly fitted therein.

2. A milk bottle case including a wooden end wall member having a cut-out located below and adjacent its upper edge defining a handle portion lying between said cut-out and the upper edge of said end wall member, said end wall member having a bore extending longitudinally thereof from one side edge to the other and located between the upper edge and the cut-out and a reenforcing rod located in and snugly fitting said bore.

3. A milk bottle case including a wooden end wall member having a cut-out located below and adjacent its upper edge defining a handle portion lying between said cut-out and the upper edge of said end wall member, said end wall member having a bore extending longitudinally thereof from one side edge to the other and located between the upper edge and the cut-out, and a reenforcing rod extending throughout the length of said bore and snugly fitting therein, said bottle case including elements overlying the opposite side edges of said end wall member for retaining the reenforcing rod within the bore.

JOHN F. MAURER, Jr.